United States Patent
Henderson et al.

(10) Patent No.: US 11,338,985 B2
(45) Date of Patent: May 24, 2022

(54) REPULPABLE CONTAINER INSULATION PRODUCTS AND METHODS OF MAKING AND USING SAME

(71) Applicant: Cellulose Material Solutions, LLC, Jenison, MI (US)

(72) Inventors: Matthew Henderson, Hudsonville, MI (US); Kevin Chase, Hudsonville, MI (US)

(73) Assignee: Cellulose Material Solutions, LLC, Jenison, MI (US)

( * ) Notice: Subject to any disclaimer, the term of this patent is extended or adjusted under 35 U.S.C. 154(b) by 31 days.

(21) Appl. No.: 16/367,563

(22) Filed: Mar. 28, 2019

(65) Prior Publication Data
US 2020/0071056 A1 Mar. 5, 2020

Related U.S. Application Data

(60) Provisional application No. 62/723,771, filed on Aug. 28, 2018.

(51) Int. Cl.
*B65D 81/38* (2006.01)
*B32B 5/16* (2006.01)
(Continued)

(52) U.S. Cl.
CPC ............ *B65D 81/3816* (2013.01); *B32B 1/02* (2013.01); *B32B 5/16* (2013.01); *B32B 29/04* (2013.01);
(Continued)

(58) Field of Classification Search
CPC ... B32B 1/02; B32B 2255/12; B32B 2264/04; B32B 2307/304; B32B 2317/12; B32B 2439/70; B32B 2553/00; B32B 29/04; B32B 37/18; B32B 5/16; B32B 2439/00; B32B 37/22; B32B 2250/03; B32B 2250/40; B32B 2260/021; B32B 2260/04; B32B 2307/7163; B32B 2307/72;
(Continued)

(56) References Cited

U.S. PATENT DOCUMENTS

| 4,579,592 A | 4/1986 | Loomis |
| 5,418,031 A | 5/1995 | English |

(Continued)

FOREIGN PATENT DOCUMENTS

EP 1882712 B1 4/2010

OTHER PUBLICATIONS

Voluntary Standard For Repulping and Recycling Corrugated Fiberboard Treated to Improve Its Performance in the Presence of Water and Water Vapor, Fibre Box Association (FBA), Aug. 16, 2013, pp. 1-23.

*Primary Examiner* — Yan Lan
(74) *Attorney, Agent, or Firm* — Mitchell Intellectual Property Law, PLLC

(57) ABSTRACT

Container insulation including a batt comprised of large paper particles, at least 90% of which by weight are greater than 10 mm in diameter. Less than 5% by weight binder fibers are used, which have a length of at least 20 mm. Most preferably, no binder fibers are used. Where the batts are faced with paper, the paper is coated with a biodegradable coating. The resulting product is repulpable and recyclable in accordance with Fiber Box Association (FBA) testing protocols.

17 Claims, 6 Drawing Sheets

(51) Int. Cl.
  *B32B 29/04* (2006.01)
  *B32B 1/02* (2006.01)
  *B32B 37/18* (2006.01)
  *D21J 1/04* (2006.01)
  *D21J 1/20* (2006.01)

(52) U.S. Cl.
  CPC ............... *B32B 37/18* (2013.01); *D21J 1/04* (2013.01); *D21J 1/20* (2013.01); *B32B 2255/12* (2013.01); *B32B 2264/04* (2013.01); *B32B 2307/304* (2013.01); *B32B 2317/12* (2013.01); *B32B 2439/70* (2013.01); *B32B 2553/00* (2013.01)

(58) Field of Classification Search
  CPC ...... B32B 2307/7246; B32B 2307/728; B32B 2307/732; B32B 2439/02; B32B 2439/40; B32B 3/04; B65D 81/3816; D21J 1/04; D21J 1/20
  See application file for complete search history.

(56) References Cited

U.S. PATENT DOCUMENTS

| | | | |
|---|---|---|---|
| 8,365,943 B2 | 2/2013 | Bentley | |
| 2007/0209307 A1* | 9/2007 | Andersen | D04H 1/54 52/404.1 |
| 2018/0050857 A1 | 2/2018 | Collison et al. | |

* cited by examiner

REPULPABLE CONTAINER INSULATION PRODUCTS AND METHODS OF MAKING AND USING SAME

CLAIM OF PRIORITY

This application claims priority to application Ser. No. 62/723,771, filed Aug. 28, 2018, and entitled REPULPABLE PACKAGING INSULATION PRODUCTS AND METHODS OF MAKING AND USING SAME.

FIELD OF THE INVENTION

The present invention relates to the field of container insulation, as for example packaging insulation, cup insulation, cooler insulation, envelope insulation, beverage container insulation or the like.

PRIOR ART

Corrugated cardboard containers are the most practical and cost-effective way to ship produce, meats, seafood and other items. Packaging insulation is used for shipping perishable items which must be kept cold during shipping. Individualized packages in which such items are shipped are lined with insulation to maintain the shipped item or items at the appropriate temperature. Current packaging insulation products comprise semi rigid expanded styrene panels, polymer bags stuffed with cotton, Kraft paper bags stuffed with cotton, cellulosic and thermoplastic fibrous batts. One problem with current packaging insulation products is that it is not itself repulpable, and hence hampers the repulpability of the cardboard shipping container it has been insulating. This creates costly environmental and disposal problems.

Repulpability is a species of recyclability. An item or material is recyclable if it can be collected and reused in some form. A cardboard or paper item or material is repulpable if it can undergo the operation of re-wetting and fiberizing for subsequent paper or cardboard sheet formation.

The Fiber Box Association (FBA) Elk Grove Village, Ill. has established definitions and tests for determining the repulpability and recyclability of cardboard products. (Aug. 16, 2013, revision of the "Voluntary Standard for Repulping and Recycling Corrugated Fiberboard Treated to Improve Its Performance in the Presence of Water and Water Vapor.") This is an industry accepted testing protocol. In the FBA test for repulpability, a 100% charge of "treated" corrugated is repulped in a Modified Waring Blender and a British Disintegrator in water at a pH of 7 (±0.5 pH) that is maintained at 125° F. (±10°) following the procedure outlined in Appendix A. (The term "treated" as used in the test is understood to mean the material being tested includes materials other than the cellulosic fibers used to form paper or cardboard sheets.) The blender pulped material is separated in a screen with 0.010-inch or smaller slots to determine fiber recovery as a percentage of the amount of fiber charged. To be deemed "repulpable," fiber yield from the repulpability test must be at least 80% based on the total weight, or 85% based on the bone-dry fiber charge to the pulper.

The FBA also has an industry recognized recyclability test: Mix a minimum of 20% treated corrugated and the remainder of the same untreated corrugated in a laboratory-scale pulper at pH 7 (±0.5 pH) and 125° F. (±100). This is the recyclability test sample. As a control, a charge of 100% of the same untreated corrugated is also pulped using identical conditions. Each pulped material is passed through (in succession) a pressure screen equipped with a basket with 0.062-inch holes, the same screen or a similar screen equipped with a basket with 0.010-inch slots and a reverse centrifugal separator under conditions specified in the procedure U.S. Pat. No. 5,418,031 to English discloses batt style insulation comprised of a blend of cellulosic material and thermoplastic fibrous material, wherein the latter comprises between 3%-15% of the blend by weight, is formed by a method such as air-laying into a low density, high loft mat. The surface of the mat is flame-treated to melt the thermoplastic component on the surface, forming a skin which keeps the cellulosic component intact. A facing sheet can be applied to the surface of the mat, as is done with conventional fiberglass batt-style insulation. The cellulosic material used by English is a free-flowing mixture of small cellulosic particles (about 1-10 mm in diameter) and short cellulosic fibers (about 0.5-3 mm in length), such as that shown in U.S. Pat. No. 4,579,592, wherein the particulates take the form of a low-density collection of cellulosic fibers and cellulosic particles (small chips or splinters). Such material typically is produced by comminuting recycled paper thereby resulting in approximately a 50/50 mixture (by weight) of particles and fibers.

U.S. Published Patent Application 2018/0050857 purports to provide a recyclable insulated package using an insulative paper fiber pad substructure with a density of less than about 10 pounds per cubic foot. The insulative paper fiber pad has entangled reinforcement fibers. A method of forming an insulative paper fiber pad using recycling-compatible or water-soluble adhesive and paper layers is provided. The resulting product is said to have a repulpability of greater than 85%. The method includes mixing paper reinforcement fibers with between about 0.5% to about 25% by weight meltable PE/PP bi-component thermoplastic binder fiber having a length less than about 16 mm. The PE/PP bi-component thermoplastic binder fibers are distributed substantially randomly within the paper reinforcement fibers to form a mixture. Heat is applied to the mixture to melt the PE/PP bi-component thermoplastic binder fiber to bind the PE/PP bi-component thermoplastic binder fiber to the paper reinforcement fibers to form a batt.

The 2018/0050857 application indicates that preferably, the material can be formed of about 10% bi-component fiber and about 90% recycled cardboard fiber. The bi-component fiber can be chopped and have a length of less than about 24 mm, less than about 16 mm, or a length between about 0.5 mm to about 16 mm, and can be mixtures of two or more lengths, preferably between about 1 mm to about 16 mm. The mixtures of two or more lengths can have ratios of from about 10% to about 90% of one fiber length to another fiber length and can have an average length of less than about 16 mm.

A batt sample of about 1300 GSM, consisted of about 90% cardboard with the binder being about 10% (with about 50% 1 mm length bi-component fiber and about 50% 6 mm length bi-component fiber). The '857 application goes on to indicate that the bi-component fibers can be between about 0.5 mm and about 16 mm polyethylene and polypropylene ("PE/PP") bi-component; and can be formed of about a 65/35 percent PE/PP mixture.

Thus, when paper particles are used as insulation, finely ground paper particles about 1-10 mm in diameter are typically used, usually mixed with short cellulosic fibers of about 0.5-3 mm in length, e.g. as in U.S. Pat. No. 5,418,031 to English. They are bound together in a batt using bi-component thermoplastic binder fibers of typically less than 16 mm, and at levels of about 10-15%. Batts of such material are typically faced with LDPE coated Kraft paper on one or both sides, and often with wrapped edges.

It is commonly believed in the thermal insulation packaging industry to that smaller cellulosic particles and fibers make better insulation by providing more air pockets in the resulting batts. These smaller particles and fibers are made by using an attrition mill. It is common to use a plate type fiberizer set at a plate gap of one eighth inch. Other types of attrition mills could be used, such as a hammer mill. The particle size of hammer mills is determined by the openings of the screen used. The resulting milled or fiberized material has small particles and small fibers, and a high dust content, e.g. 86% particles of having a diameter of 2.35 mm to 6.35 mm, 12% of fibers having generally less than 0.06 mm in length, and 2% dust. Batts pressed from such material are "bagged," that is totally enclosed in a plastic envelope, or faced on both sides and their edges with Kraft paper or similar facing material.

SUMMARY OF THE INVENTION

The present invention comprises packaging insulation for insertion into a packaging container, which insulation includes a batt comprised of large paper particles, at least 90% of which are greater than 10 mm in diameter. Less than 5% binder fibers are used, which have a length of at least 20 mm. Most preferably, no binder fibers are used. Where the batts are faced with paper, the paper is coated with a biodegradable coating.

The resulting method and product provides packaging insulation which can be fitted to the interior of a cardboard box shipping container. The packaging insulation per se, and the container and insulation together, are re-pulpable, and recyclable as determined by the industry accepted Fiber Box Association (FBA) repulpability testing protocol and recyclability testing protocol.

These and other features, advantages and objects of the invention will be more readily understood and appreciated by reference to the drawings, description of the preferred embodiments, and claims.

DESCRIPTION OF THE PREFERRED EMBODIMENTS

Figure 3:
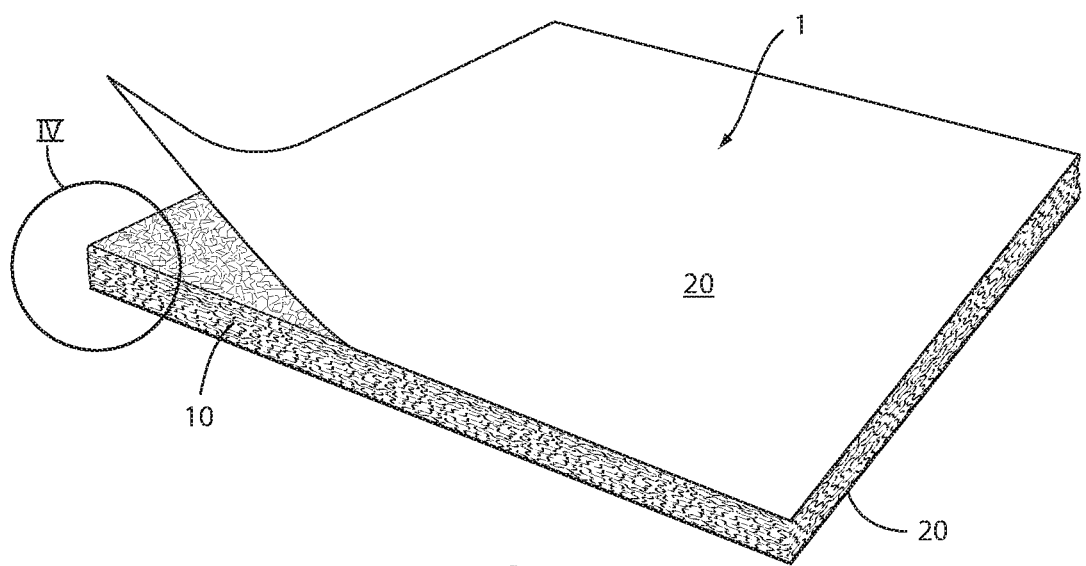
FIG. 3 is a perspective view of a preferred embodiment panel of packaging insulation, with facing paper peeled back.
Figure 4:
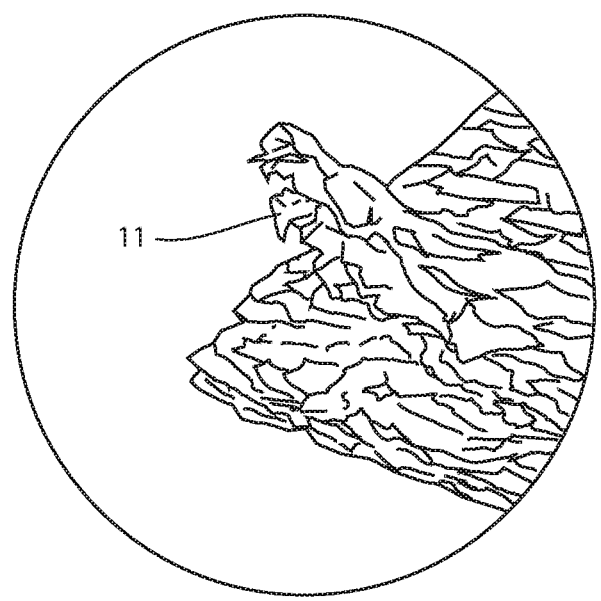
FIG. 4 is a perspective view of circle IV of FIG. 3, with a corner pried apart.

In the preferred embodiment, an insulating batt 10 is comprised of large paper particles 11, at least 90% of which are greater than 10 mm in diameter. (FIGS. 3, 4 and 5) Less than 5% binder fibers 12 are used (FIG. 5), which have a length of at least 20 mm. Most preferably, no binder fibers are used. In this embodiment, the batt 10 is faced with sheets of paper 20, coated with a biodegradable coating, resulting in a laminated insulation panel 1.

Figure 1:
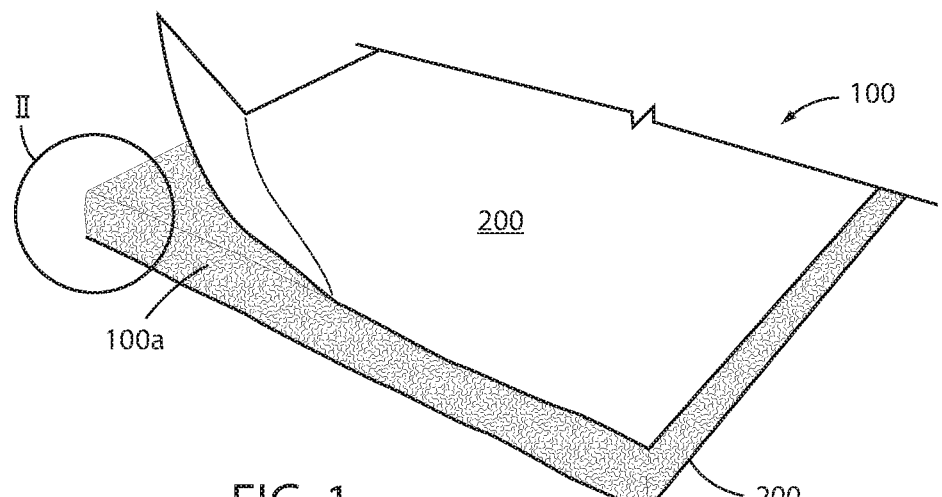
FIG. 1 is a perspective view of a prior art panel of packaging insulation, with facing paper peeled back.
Figure 2:
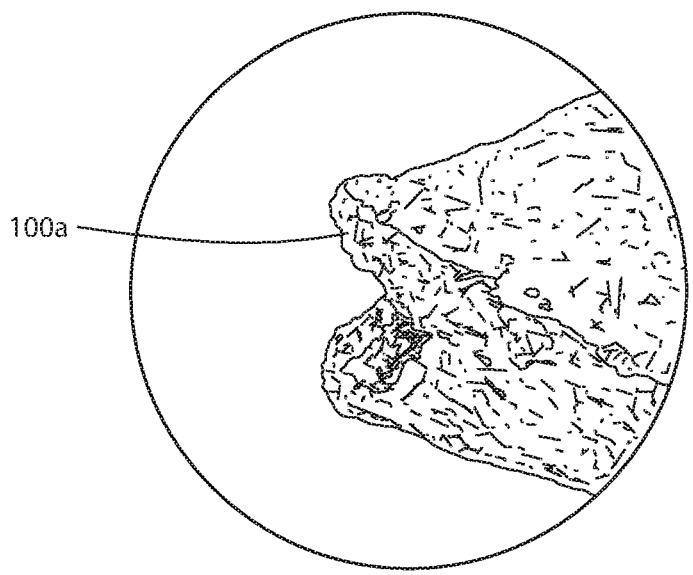
FIG. 2 is a perspective view of circle II of FIG. 1, with a corner pried apart.

In contrast, the prior art insulating batts 100a are made of cellulosic/paper fibers, or a mixture of very small particles and fibers, as illustrated in prior art FIGS. 1 and 2. Very short binder fibers are used and the Kraft paper facing 200 is typically coated with a polymer such as LDPE.

The large paper particles 11 used in the present invention are made using an attrition mill with a plate spacing of about ½". A hammer mill with appropriate screen openings and with an approximate gaping from ¹⁄₁₆ to ¼" between the rotor and the screen could also be used. Moisture in the form of water and steam is applied to the paper as it is milled in the attrition mill. Water is used at the rate of about one gallon per minute. A small amount of mineral oil is also used to effect dust suppression.

The resulting paper particles 11 as collected have a moisture content of between 10 and 20%, more preferably 14-16%. Prior to compression into batt 10, the paper particles 11 have a relatively low density of 4-5 grams per 8 volume ounces (0.017-0.021 g/cc.) In contrast, the typical small particle/small fiber milled mixture has a significantly higher density of approximately 7.7 grams per 8 volume ounces (0.029-0.034 g/cc). The difference in density can be visualized by comparing prior art FIG. 2 to prior art FIG. 4.

At least 90% of the particles 11 by weight are greater than 10 mm in diameter. A typical particle size distribution is shown in Table 1 below.

| Size (mm) | Weight % Range | Specific Example |
| --- | --- | --- |
| 10 mm or less | Less than 5% | 4.70% |
| 10-20 mm | 50-60% | 56.80% |
| 20-30 mm | 20-30% | 22.04% |
| 30-40 mm | 10-20% | 12.44% |
| 40 mm or greater | Up to 5% | 4.01% |

The particles are irregular in configuration. They are not perfectly circular. Thus, the term "diameter" as used to identify the size of the particles refers to their longest dimension. This dimension is determined by inscribing 10 mm, 20 mm, 30 mm, and 40 mm circles on a flat surface and sizing each particle of a group of particles as produced by attrition by determining which circle it fits into. The sized particles are placed in groups according to their size and weighed, to facilitate determination of the percentage of each sized group by weight. Preferably, one starts by screening out the fines using for example a screen with smaller than 10 mm diameter openings. One then starts with the 10 mm diameter circle and separates from the rest of the particles those which fit into the 10 mm circle and adds them to the fines previously screened out. The remainder are sized in the 20 mm diameter circle, and those which fit are separated from the remainder. This is repeated sequentially with the 30 mm and then 40 mm diameter circles. Each of the groups of particles so separated are weighed, and the percentage by weight are determined based on the weight of the total particles subjected to the separation process. In the specific example of Table 1, the sample subjected to the separation weighed 20.9 grams.

The binder fiber can be any thermoplastic fiber which tackifies or partially melts at temperatures at which the paper particle batt is heated prior to or during pressing e.g. 160° C. to about 195° C., typically about 165 to 175° C. Preferably, a bi-component core-sheath thermoplastic binder fiber is used, in which the sheath has a lower melting point than the core. The sheath and core can be of different thermoplastic materials, such as polyethylene and polypropylene, or can be the same type of plastic but with different melting points. A preferred binder fiber is coextruded PET bi-component core-sheath thermoplastic binder fibers having a length of at least 20 mm, and a denier of 1 d to 4 d. Preferably these fibers have a length of from 22-32 mm, and a denier of 1.5 d.

The paper facing 20 used in the preferred embodiment is coated with a biodegradable coating, rather than with a polymer material such as low-density polyethylene. The biodegradable coating serves to enhance the paper's, and the batts, impermeability to moisture. A preferable coating is a biomass derived polyester of the type disclosed in European Patent specification 1882712. It is sold commercially under the trademark "Bio PBS" by Mitsubishi Chemical Company.

The paper used is preferably Kraft paper having a thickness of about 1 to about 10 mils, more preferably about 2 to about 6 mils, and most preferably about 4 mils. From about 20# to about 60# Kraft Paper, more preferably about 30# to about 40#, and most preferably about 35#, is preferred. The presence of the binder fibers 12 in batt 10 may be sufficient to adhere the Kraft paper 20 to batt 10 during the heating, compression and cooling process described below.

The paper particles 11 are mixed with the binder fibers 12 and delivered by the flow of air into an air lay machine that forms a continuous batt and delivers it to a continuously moving conveyor belt. This is shown illustratively in FIG. 5. The paper particles 11 and binder fibers 12 mixture will be air laid to a thickness which is greater than, but appropriate to the final batt 10 thickness desired. A batt 10 as air laid on the conveyor may vary widely, but from about 3 to about 6-inch thickness is typical. The air laid batt 10 is conveyed through an oven at a temperature of about 175° C. to about 195° C., typically about 180 to 185° C. The heat of the oven tackifies the sheath of the binder fibers 12 to assist in binding the paper particles 11 and binder fibers 12 together and give the batt cohesion.

Figure 5:
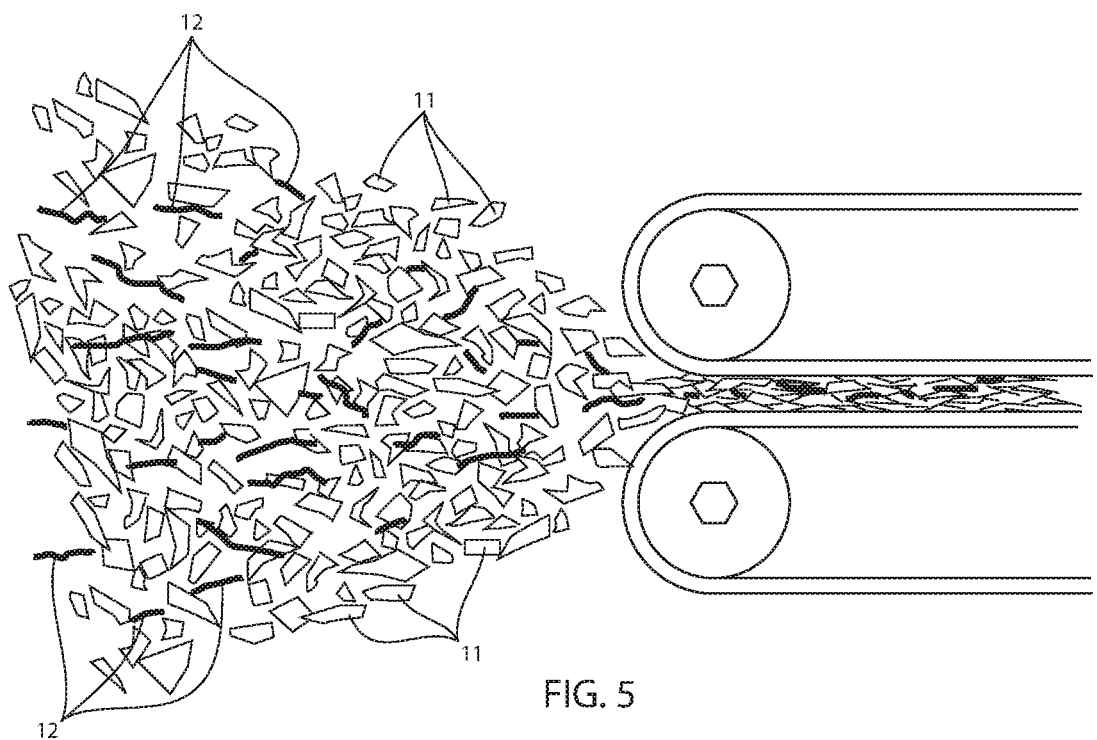
FIG. 5 is an illustrative view of air entrained large paper particles and long binder fibers being drawn into a batt and subjected to compression.
Figure 6:
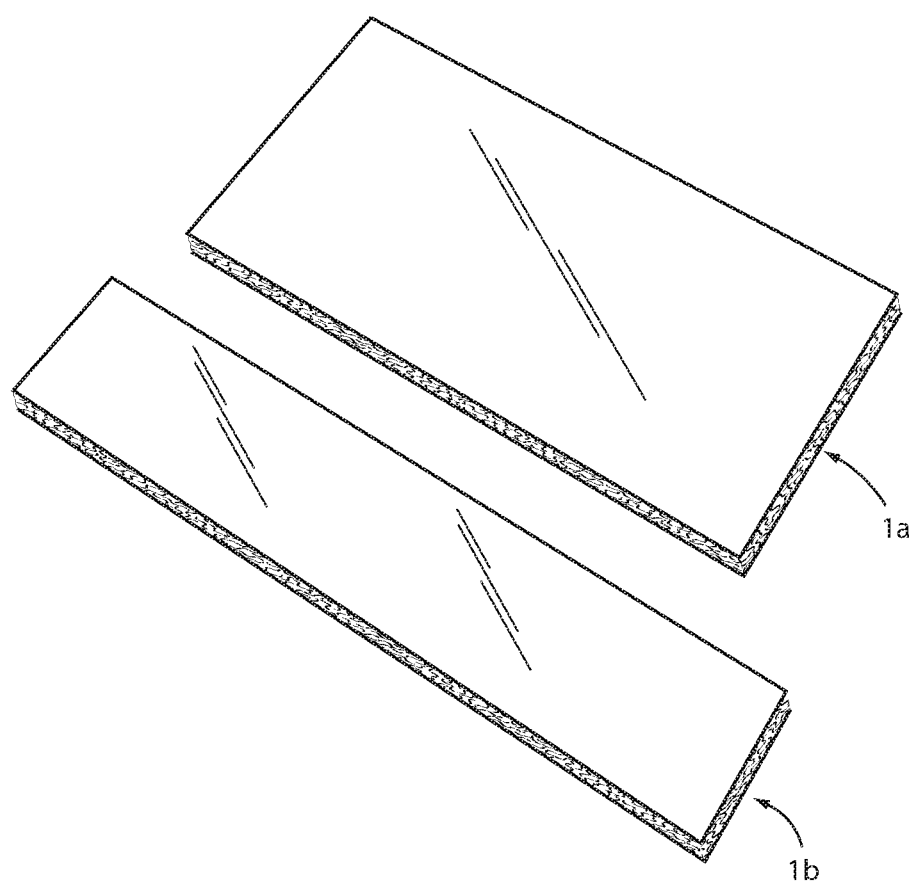
FIG. 6 is a perspective view of two panels of packaging insulation cut to fit within a shipping container.

From the oven, the batt 10 is conveyed along to compressor 50 (FIGS. 5 and 6). Compressor 50 comprises a series of upper and lower compression rollers 51a-b, 53a-b, 55a-b, 57a-b and 59a-b which respectively carry a conveyor belt 50a and 50b, made of a low friction material such as Teflon. Located between the compression rollers, are compression plates 52a-b, 54a-b, 56a-b and 58a-b, which press against the upper and lower Teflon conveyor belts 50a and 50b. The Teflon conveyor belts 50a and 50b slide over and past the compression plates.

As paper particle batt 10 is fed between the upper and lower Teflon conveyor belts 50a and 50b, at upper and lower starter rolls 51a and 51b, the biodegradable coated paper facing stock is fed from one of the upper rolls 40a under the upper Teflon conveyor belt 50a at top roll 51a and from one of the lower rolls 40b over the lower Teflon conveyor belt 50b at bottom roll 51b so as to be applied to both opposite sides of the passing fibrous batt 10 (FIG. 5). Two separate top feed stock rolls 40a can carry the same full width paper rolls and used in the alternative, or can carry paper rolls of two different widths and used in the alternative, or can carry two narrower paper rolls and used simultaneously to feed two side by side rolls of paper, which overlap slightly during the lamination process. The same is true for the two separate bottom feed stock rolls 40b.

The batt 10 continues to pass between the upper and lower Teflon conveyor belts, carried by alternating upper and lower compression rollers and compression plates, which gradually reduce the thickness of the laminated batt to the target thickness. Compression rolls 51a-b, and 53a-b are heated to from about 170° C. to about 190° C., while rolls 55a-b, 57a-b and 59a-b are cooled to about 40° F. to about 55° F. Similarly, compression plates 52a-b and 54a-b are heated to from about 170° C. to about 190° C., while plates 56a-b and 58a-b are cooled to about 40° F. to about 55° F. In this manner, binding fibers in the fibrous batt continue to be adhering and tacky and can adhere batt 10 the paper stock 20. When the paper faced batt 10 reaches the cooling rollers and cooling compression plates, the heated and tacky binder fibers begin to solidify and complete the adherence process, both between the large paper particles 11 in the batt 10, and between the batt 10 and the paper 20 laminated to each opposing face of the batt.

As the laminated assembly of paper 20 and batt 10 passes the final compression rolls 59a and 59b, it passes through longitudinal cutters 60 adjustably mounted on a support 61. This cuts the lamination to desired widths. The lamination so cut then passes a guillotine cutter blade 70 which cross-cuts the batt to desired lengths.

Figure 7:
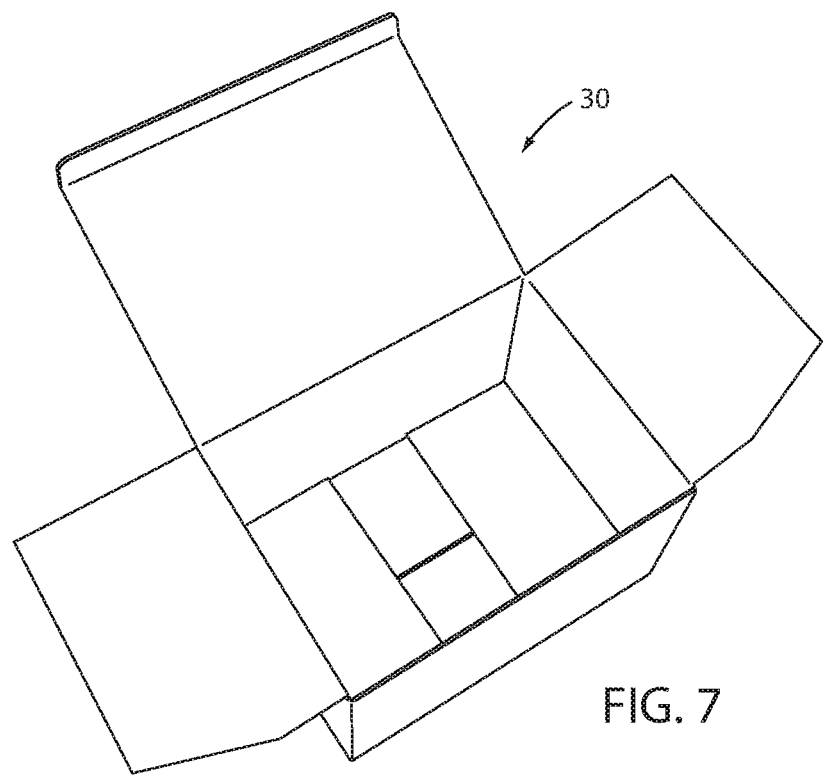
FIG. 7 is a perspective view of a cardboard shipping container without packaging insulation.
Figure 8:
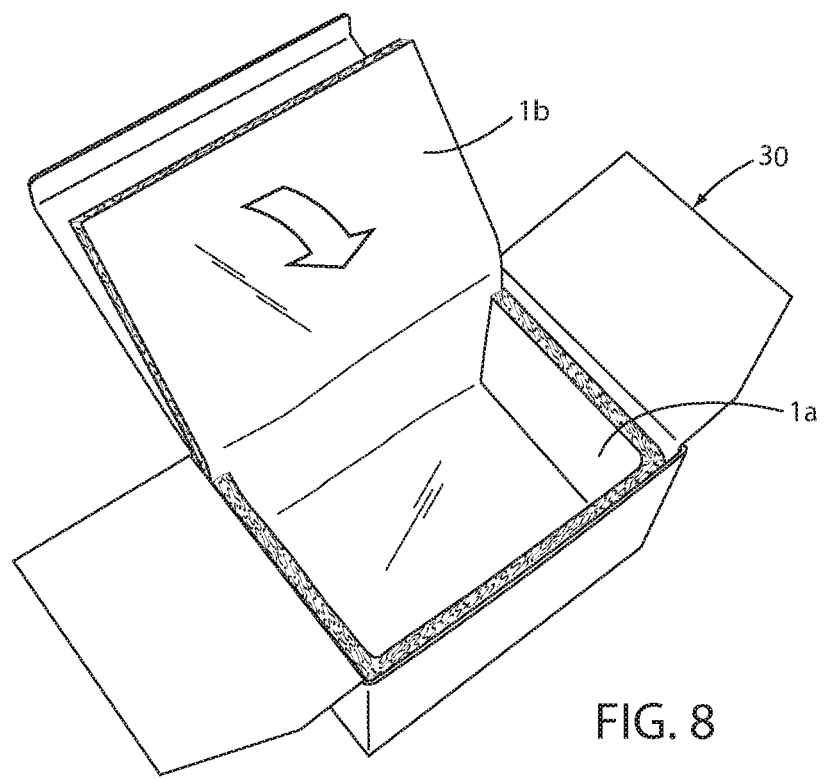
FIG. 8 is a perspective view of the container of FIG. 3 lined with the packaging insulation panels of FIG. 6.
Figure 9:
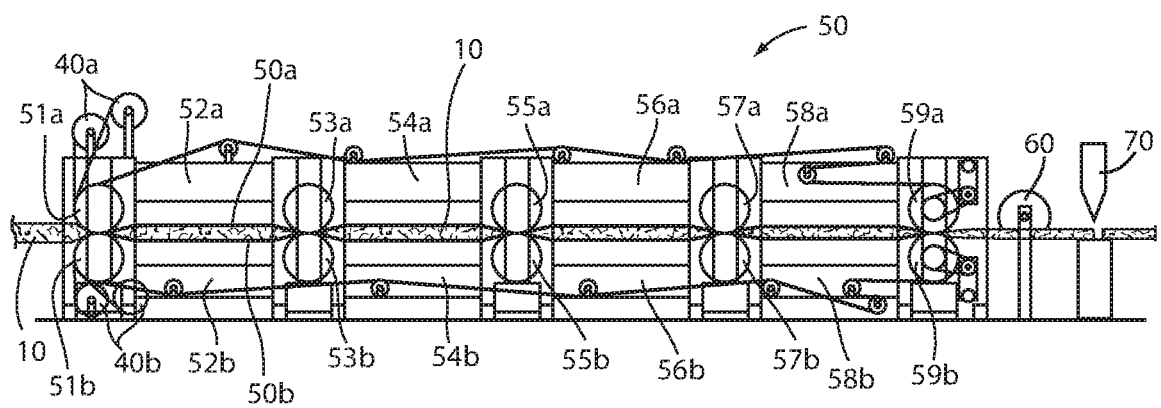
FIG. 9 is a side elevational view of the compression equipment used to form the packaging insulation of the preferred embodiment.
Figure 10:
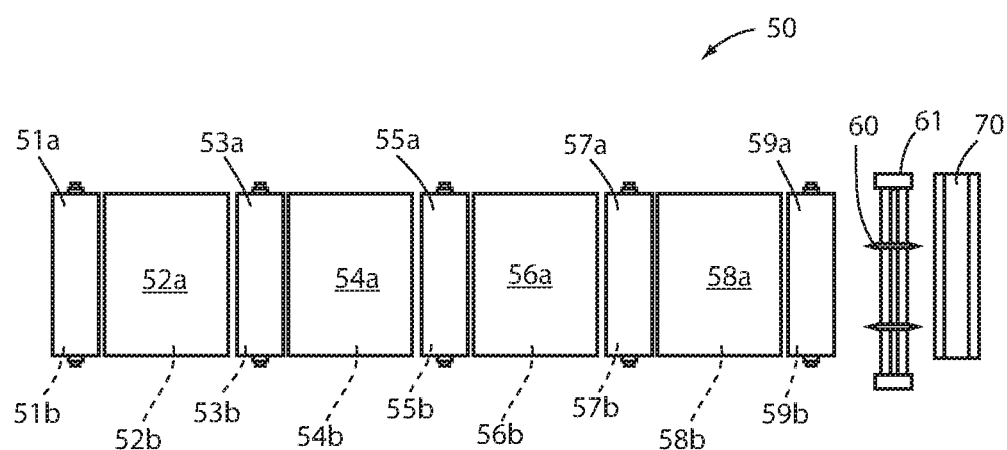
FIG. 10 is a top plan view of the compression equipment.

The resulting packaging insulation panels 1 are cut to desired dimensions for specific packaging insulation requirements, are from about ¼ to about 3 inches thick, and have a density of from about one to about seven pounds per cubic foot. The batts 10 are so well integrated that it is not necessary to wrap the exposed edges with the paper 20. The packaging insulation panels 1 can be shipped flat and compressed for economy of shipment. When they are unpacked at the customer's location, they expand back to at least near their original thickness, and can be folded to fit the packaging container 30 in which product is to be shipped. Preferably, two panels 1a and 1b are provided for each package (FIG. 6), one of which can be folded to cover the bottom, rear side and top of the container 30 (FIGS. 7 and 8), and the other of which can be folded to cover the two ends and front side of the container 30.

The entire assembly of container 30 and insulating panels 10 can be repulped separately or together. The insulating panels 10 per se have been tested by an affirmed repulpability and recyclability recognized University test site and certified repulpable and recyclable in accordance with the industry accepted Fiber Box Association (FBA) testing protocols.

Of course, it is understood that the above are preferred embodiments of the invention, and that various changes and alterations can be made without departing from the spirit and scope of the invention.

The invention claimed is:

1. An insulation batt comprised essentially of large paper particles, less than 5% by weight of said paper particles having a diameter of 10 mm or less, at least 90% of which are greater than 10 mm in diameter, and at least 55% by weight have a particle size of greater than 20 mm in diameter; and 5% or less binder fibers, which have a length of at least 20 mm.

2. The insulation batt of claim 1 in which said batt is faced with paper.

3. The insulation batt of claim 2 in which said batt is free of binder fibers.

4. The insulation batt of claim 3 which is shaped to be fitted to the interior of a cardboard box shipping container.

5. The insulation batt of claim 4 which is re-pulpable and recyclable.

6. The insulation batt of claim of claim 5 in which the particle size distribution for said paper particles includes:
50-60% by weight of said particles having size of 10-20 mm, 20-30% by weight of said particles having a size of 20-30 mm, 10-20% by weight of said particles having a size of 30-40 mm, and up to 5% by weight of said particles having a size of 40 mm or greater.

7. The insulation batt of claim 6, in which said batt is about ¼ to about 3 inches thick and has a density from about one to about seven pounds per cubic foot.

8. The insulation batt of claim 7 in which prior to compression into said batt, said paper particles have a moisture content of between 14-16%.

9. The insulation batt of claim 8 in which prior to compression into said batt, said paper particles have a density of 4-5 grams per 8 volume ounces (0.017-0.021 g/cc.).

10. The insulation batt of claim 9 in which said batt has exposed edges which are not wrapped with said facing paper.

11. The insulation batt of claim 1 which is re-pulpable and recyclable.

12. The insulation batt of claim 11 in which the particle size distribution for said paper particles includes:
50-60% by weight of said particles having size of 10-20 mm, 20-30% by weight of said particles having a size of 20-30 mm, 10-20% by weight of said particles having a size of 30-40 mm, and up to 5% by weight of said particles having a size of 40 mm or greater.

13. The insulation batt of claim 12, in which said batt is about ¼ to about 3 inches thick and has a density of from about one to about seven pounds per cubic foot.

14. The insulation batt of claim 1 in which the particle size distribution for said paper particles includes:
50-60% by weight of said particles having size of 10-20 mm, 20-30% by weight of said particles having a size of 20-30 mm, 10-20% by weight of said particles having a size of 30-40 mm, and up to 5% by weight of said particles having a size of 40 mm or greater.

15. The insulation batt of claim 14, in which said batt is about ¼ to about 3 inches thick and has a density of from about one to about seven pounds per cubic foot.

16. The insulation batt of claim 1 in which prior to compression into said batt, said paper particles have a moisture content of between 10 and 20%.

17. The insulation batt of claim 16 in which prior to compression into said batt, said paper particles have a density of 4-5 grams per 8 volume ounces (0.017-0.021 g/cc.).

\* \* \* \* \*